US006953217B2

(12) United States Patent
Hasselgruber et al.

(10) Patent No.: US 6,953,217 B2
(45) Date of Patent: Oct. 11, 2005

(54) LOCKING ARRANGEMENT FOR A MOVABLE HARDTOP VEHICLE ROOF

(75) Inventors: Andreas Hasselgruber, Eberdingen-Nussdorf (DE); Frank Neubrand, West Bloomfield, MI (US); Richard Duseck, Orchard Lake, MI (US)

(73) Assignee: CTS Fahrzeug - Dachsysteme GmbH, Hamburg (DE)

( * ) Notice: Subject to any disclaimer, the term of this patent is extended or adjusted under 35 U.S.C. 154(b) by 15 days.

(21) Appl. No.: 10/802,685

(22) Filed: Mar. 17, 2004

(65) Prior Publication Data

US 2004/0201243 A1 Oct. 14, 2004

Related U.S. Application Data

(63) Continuation-in-part of application No. 10/172,435, filed on May 16, 2002, now abandoned.

(30) Foreign Application Priority Data

Jun. 23, 2000 (DE) .......................................... 100 30 760
Jun. 6, 2001 (WO) ............................... PCT/EP01/07197

(51) Int. Cl.[7] ................................................. B60J 7/12
(52) U.S. Cl. ....................... 296/121; 296/132; 296/224; 296/107.17; 296/120.1
(58) Field of Search ................................. 296/121, 132, 296/107.17, 107.16, 108, 120, 224; 292/DIG. 5

(56) References Cited

U.S. PATENT DOCUMENTS

| 5,154,479 | A | * | 10/1992 | Sautter, Jr. ................... 296/121 |
| 5,269,586 | A | * | 12/1993 | Hahn et al. .................. 296/224 |
| 5,678,881 | A | * | 10/1997 | Tokarz ........................ 296/121 |
| 5,839,778 | A | * | 11/1998 | Schaible et al. ............. 296/224 |
| 5,944,375 | A | * | 8/1999 | Schenk et al. ............... 296/108 |
| 6,585,310 | B1 | * | 7/2003 | Guillez et al. .............. 296/108 |
| 6,666,482 | B2 | * | 12/2003 | Hansen et al. ................ 292/24 |
| 6,746,073 | B2 | * | 6/2004 | Heller et al. ................ 296/121 |
| 6,786,529 | B2 | * | 9/2004 | Hasselgruber et al. ...... 296/108 |
| 6,799,789 | B2 | * | 10/2004 | Guillez et al. .............. 296/121 |
| 6,837,535 | B2 | * | 1/2005 | Plesternings ................ 296/121 |

* cited by examiner

*Primary Examiner*—Dennis H. Pedder
*Assistant Examiner*—Greg Blakenship
(74) *Attorney, Agent, or Firm*—Klaus J. Bach

(57) ABSTRACT

In a locking arrangement for a hardtop vehicle roof, which is movable between open and closed positions and includes at least front and rear roof parts, which, in the closed position of the vehicle roof, are disposed behind one another, two locking structures with pivotal locking hooks are supported by support plates on the front roof part for engaging locking pins mounted on a windshield frame and, respectively, the rear roof part and are operable by an operating mechanism so as to pivot toward each other for engaging the locking pins and pulling the roof into firm engagement with the windshield frame, and, at the same time, the front and rear roof parts into firm engagement with each other.

6 Claims, 4 Drawing Sheets

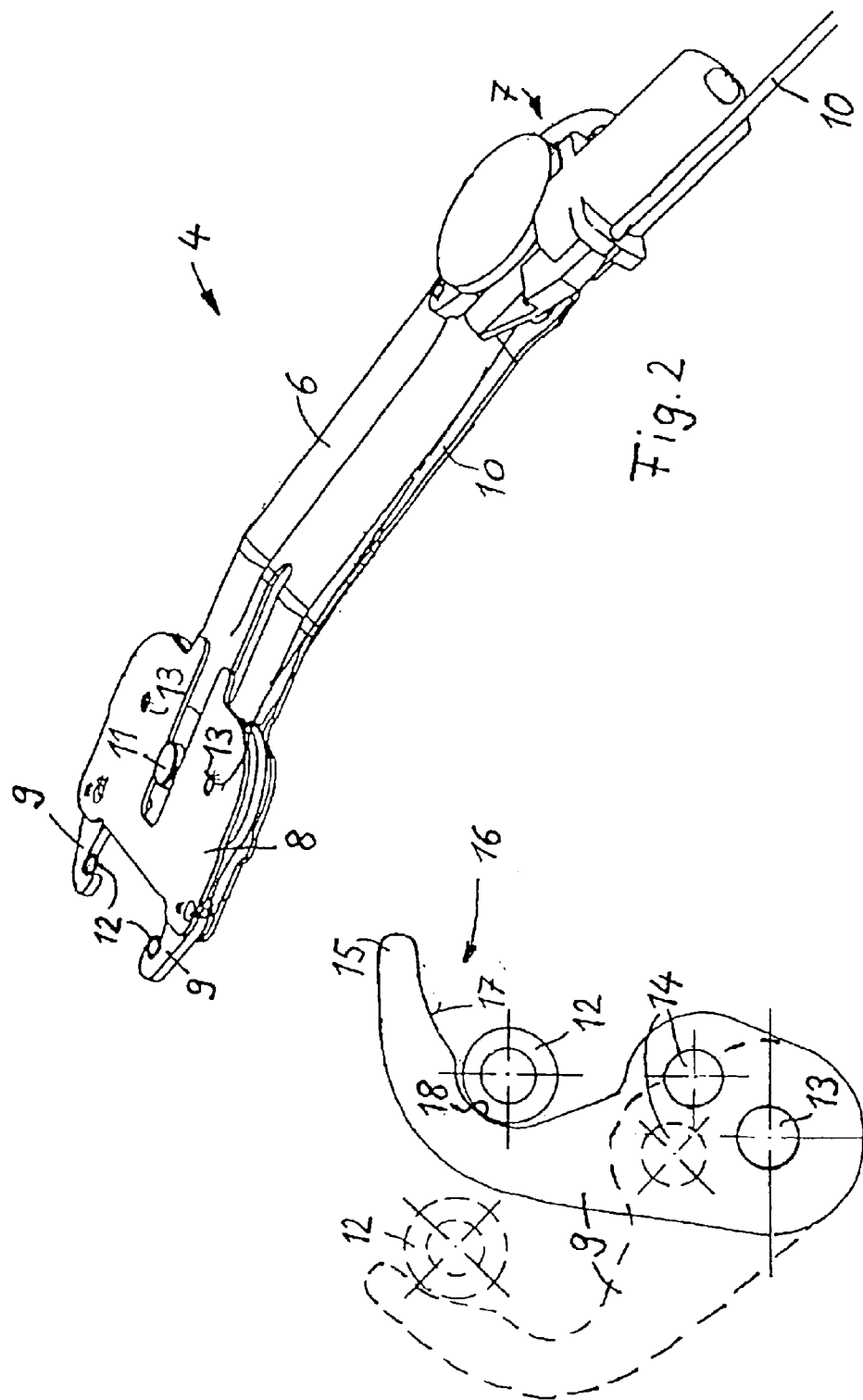

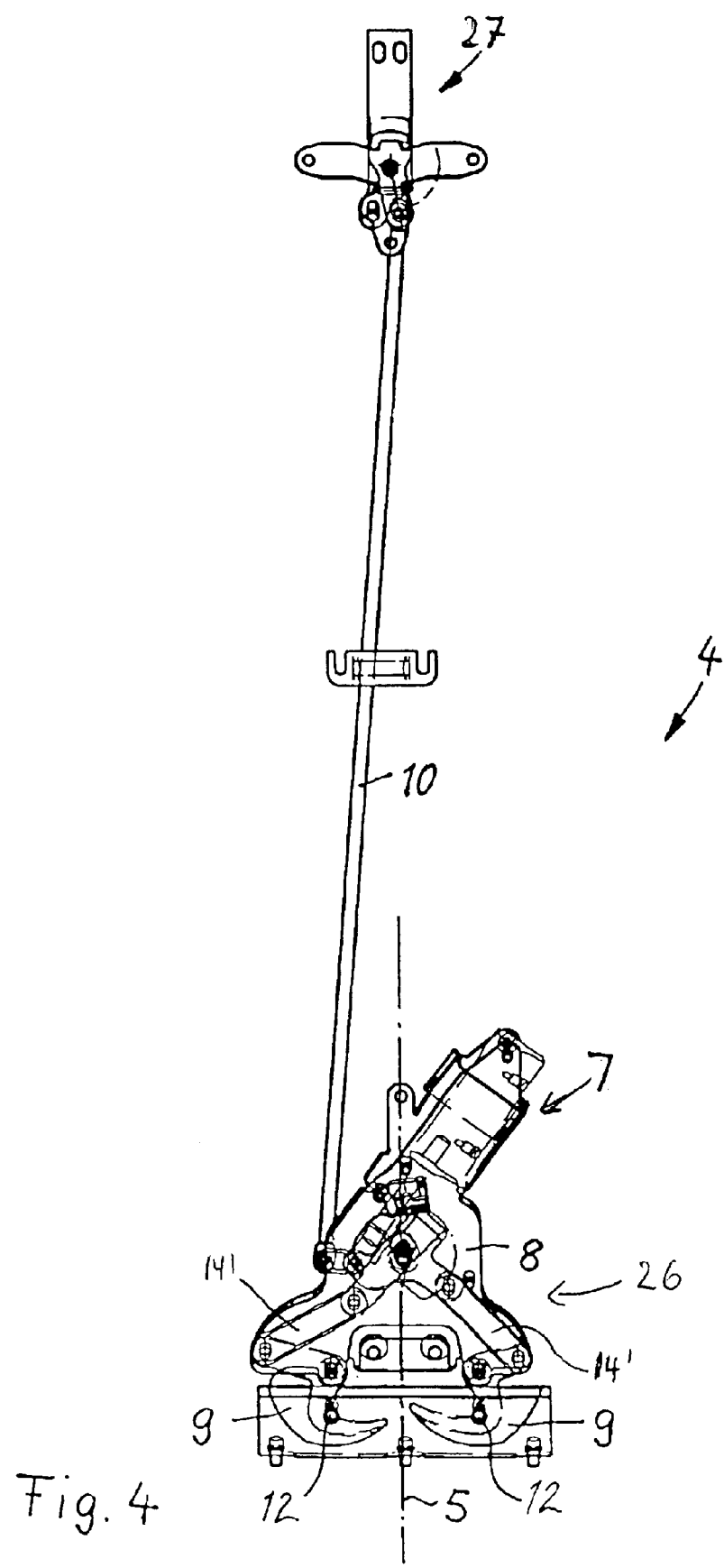

LOCKING ARRANGEMENT FOR A MOVABLE HARDTOP VEHICLE ROOF

This is a continuation-in-part application of U.S. patent application Ser. No. 10/172,435 filed May 16, 2002 now abandoned.

BACKGROUND OF THE INVENTION

The invention relates to a locking arrangement for a hardtop vehicle roof, which is movable between closed and open positions and which includes at least two roof parts arranged, in the longitudinal vehicle direction, behind one another.

WO 96/27509 discloses such a locking mechanism by which a multi-part convertible vehicle roof with two roof parts which are disposed in the longitudinal vehicle direction adjacent one another can be locked to the windshield frame when the roof is in a closed position. The locking mechanism comprises a locking hook which is mounted to the front roof part of the removable vehicle roof and a locking pin which is mounted on the windshield frame and which is engaged by the locking hook when the roof is locked in the closed position. The locking hook is rotatably supported by a pivot arm which itself is pivotally supported on the vehicle roof. The pivot arm is provided with a control element, which pivots the pivot arm about its pivot axis whereupon the connecting point between the pivot arm and the locking hook is moved along a circular path. Furthermore, the locking hook includes a guide slot in which a guide pin is received that is mounted to the vehicle roof. With the shape of the guide slot, the locking hook can execute a combined translatory and rotational locking and release movement for engaging or, respectively, releasing, the locking pin. With the guide structure, the locking hook movement is kinematically defined.

At the outer side edges of the front roof part of the convertible vehicle roof adjacent the windshield frame, there are arranged locking hooks to each of which a transverse operating lever is assigned by way of which the locking hooks can be moved between locking and release positions. The two operating levers bridge the distance between the locking hooks arranged along the outer side edge toward the center of the vehicle roof where a hydraulic operating cylinder is arranged for actuating the operating levers.

The two locking levers are arranged far apart from each other at the outer side areas of the upper roof part. The distance to the center of the vehicle roof must be bridged by correspondingly long operating levers.

DE 1 730 476 U discloses a locking arrangement for sliding roofs which includes two sidewardly spaced locking hooks on a common transversely extending support track, wherein the two locking hooks are operated by a common operating member by which both locking hooks can be moved simultaneously between their locking and release positions. The two locking hooks however are widely spaced from each other in the transverse direction, which requires a correspondingly extensive operating linkage.

It is the object of the present invention to provide a simple locking mechanism for a removable hardtop vehicle roof-top with at least two roof parts disposed adjacent each other in the longitudinal vehicle direction which mechanism is compact and reliable and has a long operating life.

SUMMARY OF THE INVENTION

In a locking arrangement for a hardtop vehicle roof, which is movable between open and closed positions and includes at least two roof parts, which are disposed behind one another, two locking hooks are pivotally supported on a support for engaging locking pins mounted on a windshield frame and operable by an operating mechanism so as to pivot toward each other for engaging the locking pins and pulling the roof into firm engagement with the windshield frame, and, at the same time, the two roof parts into firm engagement with each other.

This arrangement provides for a symmetric force distribution over the width of the vehicle roof. Furthermore, the arrangement is relatively small because the two locking hooks are arranged side-by-side in the center area of the vehicle. The two locking hooks are part of a common locking mechanism, which includes a support receiving both locking hooks and, in a particularly expedient embodiment, also a common operating member, which actuates both locking hooks at the same time. The integration into a common support part gives the optical appearance of a single compact locking member. Still, with the double hook arrangement a symmetric evenly distributed force transmission to the vehicle roof is achieved. Widely spaced locking hooks with long, transversely extending operating levers are not necessary whereby the expenditures for the force transmission mechanism between the drive structure and the locking hooks is substantially reduced.

Another advantage resides in the fact that, because of the central location of the locking arrangement, additional tasks can be performed by the locking arrangement. It is, for example, possible to interlock the front roof part and the immediately adjacent rear roof part. The interlocking with the adjacent rear roof part is achieved kinematically together with the locking of the front roof part to a vehicle body component, particularly the windshield frame and is achieved by way of a common single drive.

In an advantageous further embodiment, the inner side of the hook is in the form of a guide surface area which is provided with an engagement opening for receiving the locking pin in its locked position. With the guide structures, the locking hooks need, during the transition from release position to the locked position, engage the locking pin only with the end section of the inside guide areas of the hooks whereupon, with further actuation toward the locking position, the locking pins are guided along the guide surfaces and are finally engaged in their end positions—the locked position—in the engagement recesses formed in the guide structures. It is for example possible to arrange for a catch radius which is determined by the distance between the pivot axis of the locking hook and the tip of the hook; within this catch radius the locking pin is, during the transfer into the locked position, engaged by the locking hook whereupon the locking hook pulls itself, together with the vehicle roof, automatically into its final locking position corresponding to the closed position of the vehicle roof.

An embodiment of the invention will be described below in greater detail on the basis of the accompanying drawings.

BRIEF DESCRIPTION OF THE DRAWINGS

FIG. 2 is a perspective view of a locking mechanism for locking the vehicle roof to a windshield frame, FIG. 3 is a side view of a locking hook of a locking arrangement shown in a locked position and in an intermediate position between the locked position and the release position, FIG. 4 shows a modified embodiment with another locking mechanism.

DESCRIPTION OF PREFERRED EMBODIMENTS

Figure 1:
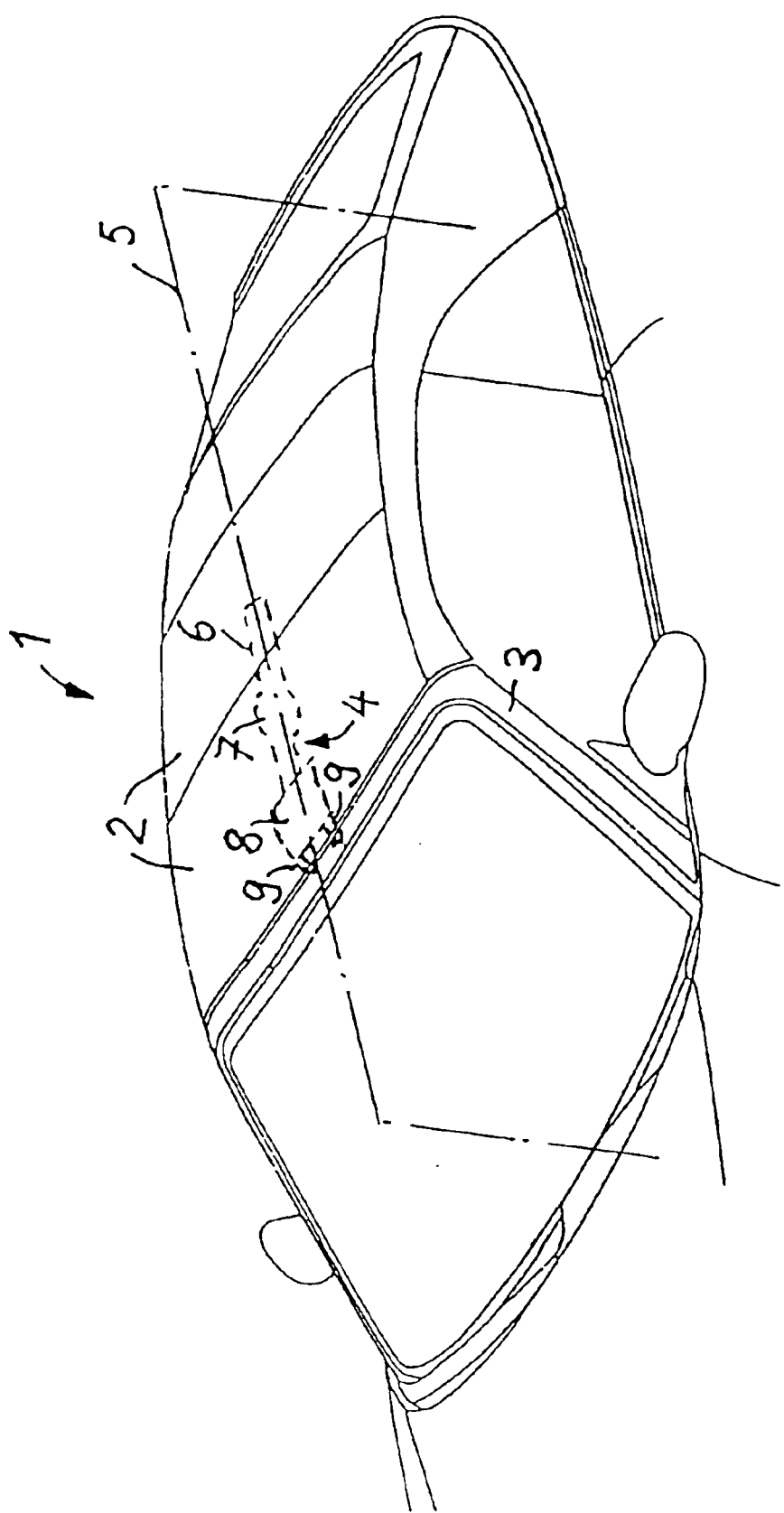
FIG. 1 is a perspective view of an adjustable hardtop vehicle roof with a plurality of roof parts arranged behind one another.

In the figures, identical components are designated by the same reference numerals.

The vehicle roof 1 as shown in FIG. 1 is movable between a closed position as shown in FIG. 1 and an open position in which the interior of the vehicle is open. The roof comprises a plurality of roof parts 2, which are arranged in the longitudinal direction of the vehicle one behind the other. The vehicle roof 1 is expediently a hardtop with rigid roof parts 2; however it may also be a soft-top with a support linkage on which a roof material is disposed.

In order to lock the vehicle roof 1 in its closed position as shown to the windshield frame 3, a locking arrangement 4, which is shown in dashed lines, is arranged on the vehicle roof. The locking arrangement 4 is disposed, symmetrically to a longitudinal center plane 5 of the vehicle, at the inner side of the vehicle roof 1. It consists of a support arm 6, a locking mechanism 26 including an electric mechanical drive 7, a support plate 8 and two locking hooks 9, which are arranged on the support plate 8 mirror-symmetrically at the left and right side of the longitudinal center plane 5. In their locking positions the locking hooks 9 engage in a form fitting manner locking pins 12, which are mounted to the windshield frame 3 and which are also part of the locking arrangement 4. The support arm 6, the locking mechanism 26 including the drive 7 and the support plate 8 are disposed in the longitudinal center plane 5.

The locking arrangement 4 is expediently used not only for the locking of the vehicle roof 1 to the windshield frame 3, but also for further locking tasks, particularly for the interlocking of the vehicle roof parts when they are disposed adjacent one another in the longitudinal vehicle direction. Therefore, an additional locking mechanism 27 for interlocking the two roof parts is provided and both locking mechanisms 26, 27 are operated preferably by a single common drive 7.

In FIG. 2, the locking arrangement 4 is shown in an enlarged representation. The preferably electro-mechanical drive 7 operates the locking mechanism 26 and also the additional locking mechanism 27 by way of operating cables or an operating rod 10. The support plate 8, on which the two locking hooks 9 are mounted, is connected to the drive 7 by way of the support arm 6 and, furthermore, includes an operating member 11 which is operable by the drive 7 and which moves both locking hooks 9 concurrently between the locking and the release positions. The locking hooks 9 are pivotally supported on the support plate 8.

FIG. 2 shows the locking structure 4 in a position between the release and locking positions. The locking hooks 9 project from the support plate 9 and engage the locking pins 12, which are mounted on the windshield frame 3 so that a form-locking engagement is established between the locking hooks 9 and the locking pins 12 and the vehicle roof is firmly engaged with the windshield frame 3.

When the locking pins 12 are engaged by the locking hooks 9, the locking hooks are pivoted about their pivot axes on the support plate 8 so that they are moved toward each other whereby the roof is tightly pulled toward, and into firm engagement with, the windshield frame 3 in which position it is locked.

FIG. 3 shows a locking hook 9 in locking position (in full lines) and (in dashed lines) in an intermediate position between the locking and the release positions. The locking hook 9 is supported pivotally about the pivot axis 13 on the support plate 8. In spaced relationship from the pivot axis 13, the locking hook includes a bore in which an operating shaft 14 is rotatably disposed. The operating shaft 14 is actuated by the locking mechanism and preferably forms a component, that is, part of the operating mechanism. It is for example a pin projecting from the operating mechanism and extending into the bore in the locking hook wherein it is rotatably received. The locking hook 9 can be actuated by the operating pin 14 via the link 14' to rotate about the pivot axis 13. Preferably, the operating pin 14 is disposed in a section of the locking hook 9 between the pivot axis 13 thereof and the tip 15 of the hook 9.

The locking hook 9 includes, at the inside 16 thereof a guide surface 17, which is provided with a locking recess 18 for receiving the locking pin 12 in the locking position. The locking recess 18 is a concavely curved guide surface area. Also, the area 17 of the guide surface between the locking recess 18 and the tip 15 of the hook 9 is concavely curved but the curvature of this area is smaller than that of the locking recess 18.

When the vehicle roof is moved from its open position to its closed position, the locking hook 9 of the locking arrangement 4 is, when approaching the windshield frame, moved by the operating member 11 from its release position to the intermediate position as shown in FIG. 3 by a dashed line. In this position, the locking pin 12 at the windshield frame 3 is caught by the slightly concave guide surface area 17 at the front end of the locking pin 9. Upon further pivoting of the locking hook 9 toward its locked position, the locking hook 9 assumes the locking position as shown in FIG. 3 in a full lines. In this position, the locking pin 12 slides into the locking recess 18 in the guide surface 17.

For the transfer of the locking arrangement from the locking position to the release position, the procedure is reversed.

FIG. 4 shows the locking arrangement 4 of a modified embodiment in a locking position wherein the locking pins 12 are engaged by the locking hooks 9 in a position in which the locking hooks 9 are pivoted toward each other as far as possible. The operating cable or rod 10, which is actuated by the drive 7 for operating the locking hooks 9 between the locking and release positions is connected to the operating mechanism at one side of the longitudinal center plane 3 of the vehicle. The longitudinal center plane 5 coincides with the mirror reverse plane of the locking hooks 9. The operating mechanism is mounted on the support plate 8 and actuates both locking hooks 9 at the same time.

Figure 5:
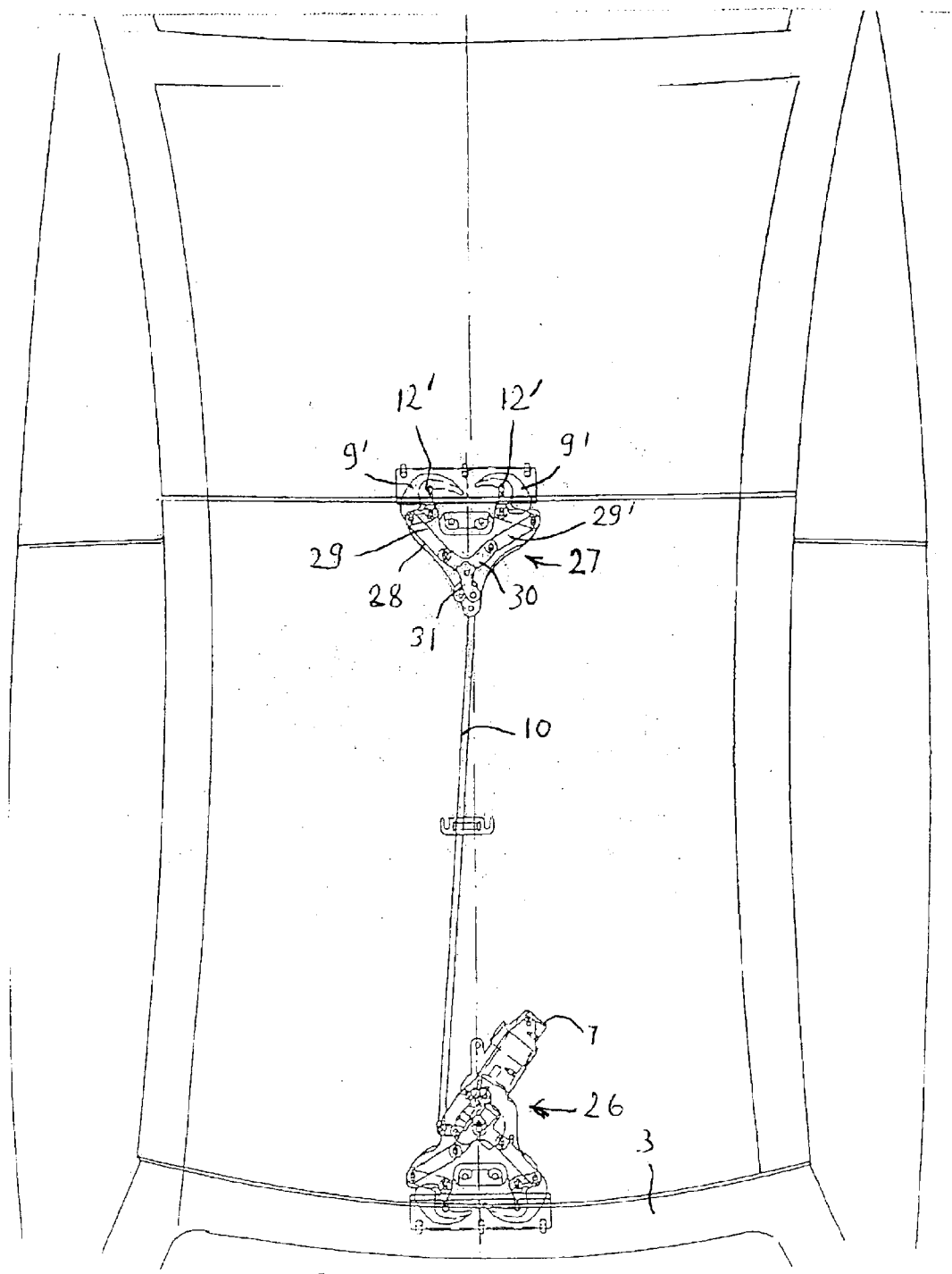
FIG. 5 is a top view of the hardtop vehicle roof.

FIG. 5 shows the vehicle top with the two roof parts 2 joined by the locking mechanism 27 and the front roof part locked to the windshield frame 3 by the locking mechanism 26, as described with reference to FIGS. 2, 3 and 4.

The locking mechanism 27 for interlocking the two roof parts is essentially the same as the locking mechanism 26. It also includes a support plate 28, which is mounted on the front roof part at the rear end thereof near the rear roof part and on which two additional hooks 9' are supported so as to be movable between a locking position and a release position. In the locking position, the additional hooks 9' each engage a locking pin 12' mounted on the rear roof part of the vehicle for firmly engaging the rear roof part with the front roof part. The front locking mechanism 26 and the rear locking mechanism 27 are interconnected by an operating cable or rod 10 so that they can both be actuated at the same time by a single electro-mechanical drive 7. For causing the hooks 9' in the mechanism 27 to release the locking pins 12' the cable or rod 10 is pulled forwardly by the locking mechanism 26. The hooks 9' are connected by links 29 to a yoke 30, which is operated by the rod 10 by way of a connecting link 31, so that both sets of hooks 9 and 9' can be actuated at the same time by a single electric drive 7. In the process, the hook engagement forces are not transmitted to the roof parts, but are counterbalanced within the mounting plates for the hooks and also for the engagement pins 12 and 12' which are also mounted on respective mounting plates.

What is claimed is:

1. A locking arrangement for a hardtop vehicle roof movable between a closed and an open position and comprising at least a front and a rear roof part arranged, in the longitudinal vehicle direction, one behind the other, said locking arrangement including a first locking structure with a first support plate mounted on said front roof part at the front end thereof, two locking hooks supported on said first support plate so as to be pivotable between a locking position and a release position, each locking hook engaging, in said locking position, a locking pin mounted on a windshield frame of said vehicle, a second locking structure mounted on said front roof part at the rear end thereof adjacent said rear roof part, and an operating mechanism for operating said locking structures, said locking hooks of said first locking structure being arranged on said support plate in a mirror-reversed arrangement with respect to a longitudinal center plane of the vehicle, said operating mechanism including an operating member extending between said first and second locking structures for the concurrent operation of said locking structures, and a common drive for actuating said operating member for the concurrent operation of said locking structures for interlocking said adjacent roof parts together with the locking of the front roof part to the windshield frame.

2. A locking arrangement according to claim 1, wherein said second locking structure includes two additional locking hooks supported on a second support plate so as to be pivotable between a locking position and a release position, each additional locking hook engaging, in said locking position a locking pin mounted on said rear roof part of said vehicle.

3. A locking arrangement according to claim 2, wherein said locking hooks are supported on said support plates so as to be pivotable about a pivot axis and each locking hook includes a bore arranged in spaced relationship from said pivot axis, and an operating pin is received in each bore, each of said operating pins being operatively connected to said operating member for concurrently actuating said locking hooks.

4. A locking arrangement according to claim 2, wherein each of said hooks has inner curved guide surfaces which include locking recesses for receiving said locking pins in the locking position of said locking hooks.

5. A locking arrangement according to claim 3, wherein said inner guide surfaces of said locking hooks are arranged so as to face each other for the engagement of said locking pins.

6. A locking arrangement according to claim 4, wherein said locking pins are supported on support plates mounted to said windshield frame and said rear roof part, respectively.

* * * * *